United States Patent [19]

Clifford et al.

[11] Patent Number: 4,760,743

[45] Date of Patent: Aug. 2, 1988

[54] ACOUSTIC SCINTILLATION LIQUID FLOW MEASUREMENT

[75] Inventors: Steven F. Clifford, Boulder, Colo.; David M. Farmer, Saanichton, Canada

[73] Assignee: The United States of America as represented by the Secretary of Commerce, Washington, D.C.

[21] Appl. No.: 40,683

[22] Filed: Apr. 14, 1987

Related U.S. Application Data

[63] Continuation of Ser. No. 751,118, Jul. 2, 1985, abandoned.

[51] Int. Cl.$^4$ .......................... G01F 1/70; G01P 5/18
[52] U.S. Cl. .............................. 73/861.06; 73/170 A
[58] Field of Search ........... 73/861.04, 861.05, 861.06, 73/170 A

[56]  References Cited

U.S. PATENT DOCUMENTS

| 3,762,221 | 10/1973 | Coulthard | 73/861.06 |
| 3,858,446 | 1/1975 | Flemons | 73/861.06 |
| 3,949,605 | 4/1976 | Stallworth et al. | 73/861.27 |
| 4,019,038 | 4/1977 | Critten et al. | 73/861.06 |
| 4,162,630 | 7/1979 | Johnson | 73/861.27 |
| 4,201,083 | 5/1980 | Kurita et al. | 73/861.06 |
| 4,257,275 | 3/1981 | Kurita | 73/861.06 |
| 4,555,947 | 12/1985 | Van Prooijen | 73/861.06 |

FOREIGN PATENT DOCUMENTS 2083624  3/1982  United Kingdom ............. 73/861.06

OTHER PUBLICATIONS

"Spectral Analysis and Its Applications", Gwilym M. Jenkins and Donald G. Watts, pp. 146, 154 and 173.
Flemons, "A New Non-Intrusive Flowmeter" in N.B.S. Special Publication 484, 10/77, pp. 319-333.

Primary Examiner—Herbert Goldstein
Attorney, Agent, or Firm—Thomas Zack; Alvin Englert; Robert E. Harris

[57]  ABSTRACT

A system and method are disclosed for acoustic scintillation liquid flow measurement. Measurement is carried out by acoustic beams transmitted perpendicular to the direction the component of liquid flow to be measured, with both phase and amplitude measurements being made to enable generation of accurate speed of flow indications which are indicative of liquid flow through a broad area being monitored as opposed to a single point therein. In one realization of this invention, a pair of projectors are mounted on one side of the flow area, such as a channel to be monitored, and a pair of receivers are mounted on the other side of the flow area with pulsed acoustic signals from each of the projectors being transmitted in separate parallel paths through the liquid, such as water, to the receivers. At the receivers, electrical signals indicative of received acoustic signals in each path are complex demodulated after which the demodulated outputs are shaped, converted and then coupled to a microcomputer for evaluation and, responsive thereto, providing the indication of liquid flow speed.

14 Claims, 2 Drawing Sheets

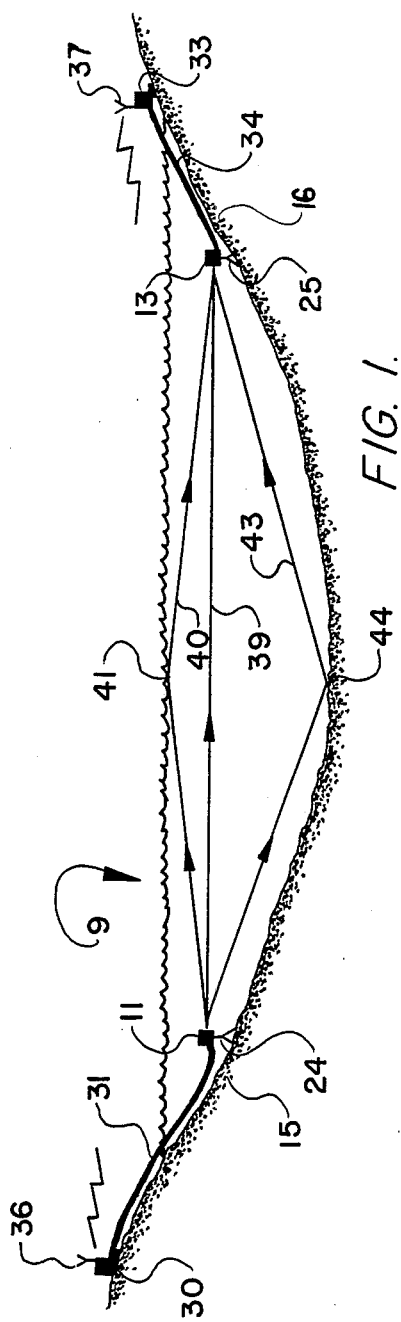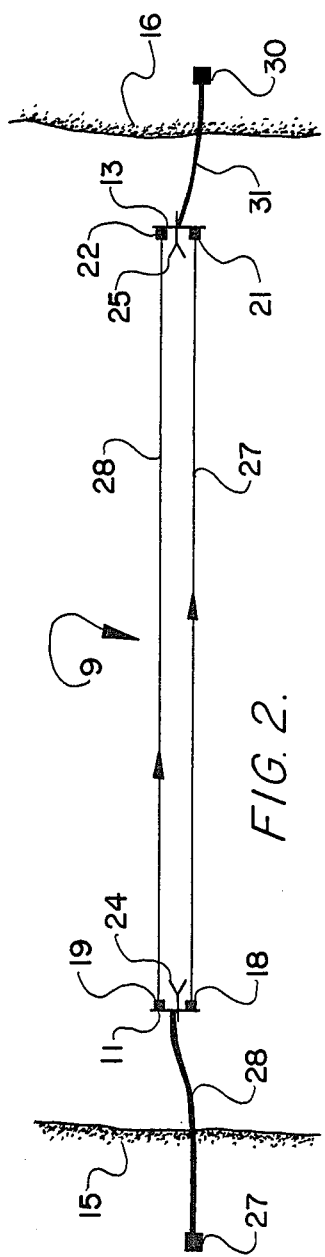

ACOUSTIC SCINTILLATION LIQUID FLOW MEASUREMENT

This application is a continuation of application Ser. No. 751,118, filed July 2, 1985, now abandoned.

FIELD OF THE INVENTION

This invention relates to fluid flow measurement, and, more particularly, relates to acoustic scintillation fluid flow measurement.

BACKGROUND OF THE INVENTION

Measurement devices are now widely known for measuring the flow of various fluids, and such devices have been heretofore suggested for measurement of flow of at least some fluid utilizing acoustic signals.

There is no satisfactory technique now known, however, for obtaining real time measurements of the speed of flow of liquid, and, more particularly, of such measurements in heavily used traffic channels on waterways. While it is presently possible to use an upward looking Doppler system to obtain a vertical profile of the current at one location in a liquid, this will not produce a measurement representative of other points across a broad area such as a water channel.

In water channels, such measurements would heretofore have required cables and other equipment on the sea floor, which is not only expensive, but also is vunerable to breakage, such as can occur, for example, due to dragging anchors and the like. Moreover, measurements that might be obtained through use of current meters moored at points across a channel using radio or other links cannot normally be used because of the traffic hazards created.

An alternative technique using horizontally projected back-scattered sound is also known. For example, sound transmitted from one side of a channel of water whose flow is to be measured is scattered back to a receiver or receivers co-located with the projector. Doppler shifts or horizontal translation of the patterns in the back-scattered sound, or some related effect, may then be detected and the resulting flow inferred (see, for example, A. Laenen and W. Smith, Acoustic systems for the measurement of streamflow, Paper 2213, U.S. Geological Survey, Water-Supply, pages 7 and 20, 1983).

A serious difficulty associated with all such acoustic back-scatter systems however, especially when oriented horizontally, is the fundamental inefficiency of the back-scatter process. Only a minute fraction of the projected sound is returned to the hydrophones. Thus, it is very difficult to achieve measurements over substantial ranges with this technique, in contrast to the forward propagation technique described in this invention in which the projectors point directly toward the hydrophones.

A second difficulty associated with back-scatter techniques is due to scattering from the channel surface or floor, since scattering from these boundaries tends to be much stronger than scattering from particles or inhomogeneities in the water column, and thus imposes severe demands on the acceptable beam patterns of the projectors and receivers. Back-scatter systems are also sensitive to the presence or absence of acoustic scatteres in the water column, and, moreover, it is difficult to tell the depth at which the scattering is taking place.

Normal current measurements in a water channel or the like have therefore been now commonly made over a short time period, and predictions made therefrom using harmonic analysis of the data. Such predictions, however, are subject to significant error from several sources, including meteorological effects such as wind, atmospheric pressure changes, and river run-off, as well as limitations of the current meter measurements themselves.

Measurement of gas flow perpendicular to a transmitted electromagnetic beam is also known, and has been used extensively in connection with the atmosphere. In addition, measurement of gas flow perpendicular to the transmitted beam of an optical arrangement is also known (see, for example, U.S. Pat. Nos. 3,623,361 and 4,201,467).

Measurement, such as flow measurement of water across a channel, cannot, however, normally be made using an electromagnetic beam or an optical arrangement. For measurement of such flow, acoustic waves have therefore been heretofore utilized. When utilizing acoustic signals for measurement of water flow, however, such acoustic devices have heretofore measured the speed of the current in a section oblique to the direction of flow of the water (see, for example, U.S. Pat. Nos. 4,094,193 and 4,446,542).

In addition, while a reciprocal transmission approach has been previously used for water flow measurements in channels, this technique can only be used to infer the flow component along an acoustic beam as opposed to measurement perpendicular to the acoustic paths, which is considered essential in this invention.

The reciprocal transmission approach has been used to measure flow along water channels by the rather complex procedure of setting up acoustic paths at angles to the flow, and the components of flow inferred from the reciprocal travel times may then be combined to deduce the component of flow along the axis.

Aside from the additional complexity of set-up, this technique is subject to serious error due to the required assumptions regarding similarity of the flow field along the separate acoustic paths. When flow measurements along each path are combined to form the mean component along the channel access, the resulting combination will only be an accurate representation of the flow if the components from which it is derived are based on similar flow fields. Since the components are derived from paths that are quite different, this assumption cannot be generally valid.

Measurement of flow using a single transmitter and two receivers has also previously been suggested in an article by the named inventors herein (S. F. Clifford and D. Farmer, "Ocean Flow Measurements Using Acoustic Scintillation", J. ACOUS. SOC. AM., Volume 74 (6), pages 1826-1832, December 1983). In the experiment set forth in this article, parallel acoustic paths and pulsed operation were not utilized (very short path lengths were involved), and assumptions were required with regard to the distribution of the flow profiles along the beam due to the use of a single transmitter.

SUMMARY OF THE INVENTION

This invention provides a system and method for monitoring liquid flow across an area (such as a water channel and the like) to thereby provide accurate information with respect to the speed of such liquid flow, with such flow information being provided in real time and not being restricted to any particular spot in the broad area being monitored. Spaced acoustic beams are transmitted perpendicular to the direction of the flow of the liquid being monitored, and both phase and amplitude measurements are made with the receiver processing circuitry including complex demodulation with the demodulated output being shaped, converted, and then evaluated at a microcomputer to provide an indication of the liquid flow speed.

It is therefore an object of this invention to provide a system and method for measuring the flow speed of a liquid.

It is another object of this invention to provide a system and method for measuring flow speed across a broad area such as a water channel or the like.

It is another object of this invention to provide a system and method for measuring flow speed utilizing acoustic scintillation.

It is still another object of this invention to provide a system and method for measuring flow speed utilizing spaced acoustic beams transmitted perpendicular to the direction of liquid flow.

It is still another object of this invention to provide a system and method for measuring flow speed utilizing complex demodulation.

It is yet another object of this invention to provide a system and method for measuring flow speed utilizing signal shaping, conversion and evaluation using a microcomputer.

With these and other objects in view, which will become apparent to one skilled in the art as the description proceeds, this invention resides in the novel construction, combination, arrangement of parts and method substantially as hereinafter described and more particularly defined by the appended claims, it being understood that changes are meant to be included as come within the scope of the claims.

DESCRIPTION OF THE DRAWINGS

The accompanying drawings illustrate a complete embodiment of the invention according to the best mode so devised for the practical application of the principles thereof, and in which;

FIG. 1 is a cross-section schematic view of a water channel showing positioning of the system of this invention with respect thereto;

FIG. 2 is a top plan view of the channel as shown in FIG. 1, illustrating positioning of the components of each array;

DESCRIPTION OF THE INVENTION

Figures 3, 4, 5, 6:
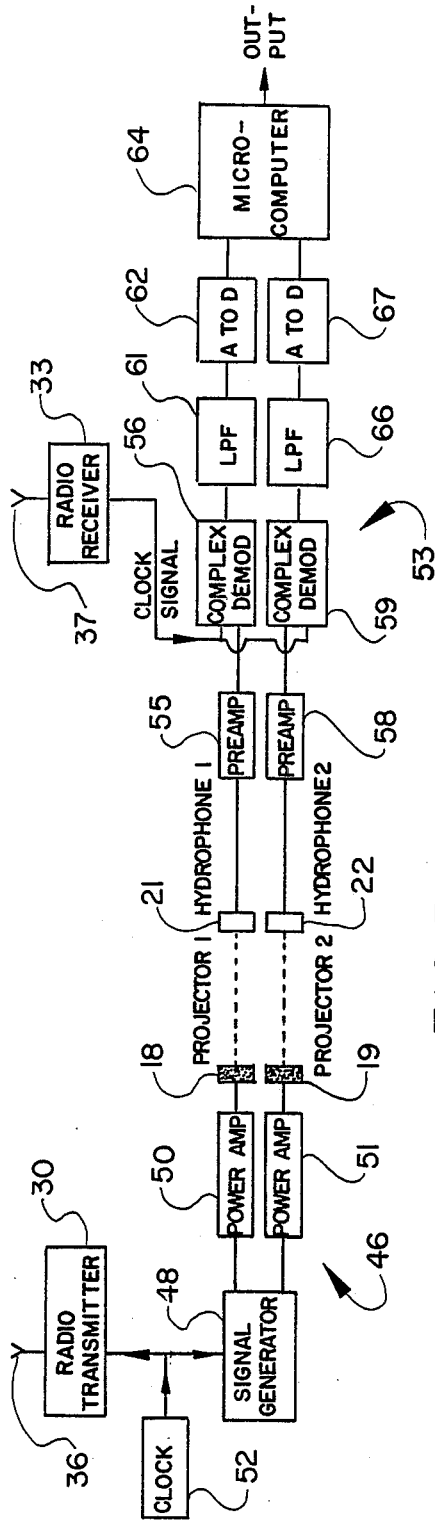
FIG. 3 is a schematic electrical block diagram of the overall system of this invention.
FIG. 4 is a typical example of an electrical signal derived from an acoustical signal received by the hydrophones shown in FIG. 3.
FIG. 5 is a typical example of electrical signals derived from the acoustic signals received at the two hydrophones, as shown in FIG. 3, to illustrate the angular differences therebetween.
FIG. 6 illustrates, typically, the calculated cross-covariance of the signals received at the two hydrophones shown in FIG. 3.

As indicated in FIGS. 1 and 2, this invention is particularly useful in providing acoustic flow measurements made perpendicular to the direction of flow across a liquid flow area, and particularly across an expanse of water 9, such as a channel (the term "channel", as used herein, is meant to include any like expanse, or area, of water having a measurable flow rate). In addition, and for simplicity of discussion, the term "water" will be utilized, but it is meant to be realized that the invention could be utilized with other liquids, and the invention is not meant to be limited to use in connection with water.

To accomplish measurement according to this invention, it is necessary to deploy an acoustic projector array 11 and a receiver array 13 at different sides 15 and 16, respectively, of the channel with the projectors and receivers of the arrays facing one another. Projector array 11 includes at least two high frequency acoustic transducers, or projectors, 18 and 19 (as indicated in FIGS. 2 and 3), and receiver array 13 includes at least two high frequency receivers, such as a hydrophones 21 and 22 (as also indicated in FIGS. 2 and 3).

Both projector array 11 and receiver array 13 are rigidly mounted, by tripods 24 and 25, respectively, as indicated in FIGS. 1 and 2, or by any other assembly fixed to the ground which could include, for example, pilings, bridge piers, and the like. The transducers are maintained at a fixed position horizontally spaced a short distance with respect to each other, which spacing includes a component parallel to the direction of flow of the water to be measured so that parallel transmission paths can be established through the water. Likewise, the receivers are maintained at a fixed position horizontally spaced a short distance with respect to each other, which spacing also includes a component parallel to the direction to the flow of water to be measured so that the receivers are aligned with the projectors. When the projectors and the receivers of the arrays are mounted with the transducers and receivers aligned and facing one and another across the channel, a pair of parallel acoustic signal paths 27 and 28, as indicated in FIG. 2, are established through the water perpendicular to water flow in the channel. In this manner, forward scattered sound waves in the water (as opposed to back scatter) are utilized to derive information about flow speed perpendicular to the acoustic beams.

As indicated in FIGS. 1 and 2, projector array 11 is connected with radio transmitter 30 through cable 31, and receiver array 13 is connected with radio receiver 33 through cable 34 to thereby establish a radio transmission link between the arrays utilizing antennas 36 and 37 at radio transmitter 30 and radio receiver 33, respectively. This radio transmission link is used for transferring time, or synchronization information between arrays so that the phase of the received signal can be measured precisely with respect to that of the transmitted signal. To accomplish this end, the synchronizing signal commonly has the same format as, and is in phase with, the acoustic signal (which also may be controlled by the same synchronizing signal).

Each of the acoustic signal paths 27 and 28, extending across the channel from the transducers to the receivers, has three principal components, as indicated in FIG. 1, including a direct path 39 and two reflected paths, with one path 40 being reflected from surface 41 of the water and the other path 43 being reflected from the bottom 44 of the channel. Where needed or desired, additional transducers and receivers could be utilized to form additional acoustic signals paths, and/or cross paths could likewise be utilized (i.e., between transducer 18 and receiver 22 and between transducer 19 and receiver 21). When utilizing cross paths, spatial aperture filtering techniques, such as have heretofore been developed for remote sensing of electromagnetic radiation (see, for example, Lee, "Remote Probing Using Spatially Filtered Apertures", J. OPT. SOC. AM., Volume 64(10), pages 1295–1303, 1974) can be utilized to derive flow speeds at different points across a channel. For this purpose, more than two projectors and two hydrophones may usefully be employed for improved spatial resolution.

A block diagram of the overall device of this invention is shown in FIG. 3. As shown, projector side 46 includes projectors, or transducers, 18 and 19 separately connected with signal generator 48 through power amplifiers 50 and 51, respectively. Signal generator 48 provides a pulse output to each projector with the pulse output from transducer 18 occurring timewise before the pulse output from transducer 19 (which can be accomplished by providing the pulses from the generator in succession to each transducer). Pulse outputs are repeatedly provided to the transducers with a predetermined pause between each pulsing cycle.

In the simplest form, signal generator 48 can produce simple rectangular pulses at a desired frequency. More sophisticated processes can be utilized involving coding or spread spectrum techniques to improve signal-to-noise ratios and the stability of the resulting signal. While such sophisticated signals might be desirable for particular applications, they are not considered essential to this invention.

Clock 52, shown in FIG. 3 connected with radio transmitter 30 and signal generator 48, provides a synchronizing, or timing, signal to both the projector side 46 and to the receiver side 53, with the receiver side 53 receiving the timing signal through the radio transmission link.

As indicated in FIG. 3, receiver side 53 includes hydrophones 21 and 22. Hydrophone 21 is connected through preamplifier 55 to complex demodulator 56, while hydrophone 22 is connected through preamplifier 58 to complex demodulator 59. Complex demodulators 56 and 59 receive the timing input (clock) input signal from radio receiver 33.

The output signal from complex demodulator 56 is coupled through low pass filter 61 to analog-to-digital converter 62, with the digital output signal from converter 62 being coupled to microcomputer 64. In like manner, the output signal from complex demodulator 59 is coupled through low pass filter 66 to analog-to-digital converter 67, with the digital output signal from converter 67 being also coupled to microcomputer 64.

In this invention, the use of phase measurement, together with amplitude measurement, as opposed to the use of amplitude measurement alone, is important. With each of the projectors driven by the same clock, the sound transmitted by each is in phase with that of the other. At the receiving end, the useful portion of the signal is encoded in the flucuations in phase and amplitude, rather than in the actual value of the phase relative to the source. It is merely sufficient that the clock be stable enough such that over the period taken for inhomogeneities in the flow to pass through the successive acoustic paths, no appreciable uncertainty in phase drift exists between the projector and the receiver clocks. Clocks having this stability are presently readily available.

Utilizing a pair of projectors and a pair of receivers, deployed as shown in FIGS. 1 and 2, small temperature or salinity (and hence sound speed) fluctuations can be sensed since they are always present in a water mass moving through a channel (at speed v). These fluctuations result in phase perturbations and amplitude scintillations (analogous to the effect of a twinkling star) at the receivers 21 and 22. Such fluctuations occur at many scales in the water, from a few millimeters up to the full channel width.

As the current passes through the acoustic beams, it carries these sound speed variations with it, resulting in a corresponding horizontal translation of the phase and amplitude fluctuations across the receiving array. When using two parallel paths, as indicated in the example of FIG. 2, time of travel through the paths is x/v, where x is the path spacing and v is the current speed. Correlation analysis (as brought out hereinafter) can then be carried out by the microcomputer in real time to provide a direct measurement of the translation of the fluctuations, and hence of the flow speed, perpendicular to the acoustic paths.

Separation between acoustic signal paths is accomplished on the receiver side using an appropriate bit width in the signal coding (or pulse width if signal coding is not employed), which bit width (or pulse width) must be appreciably less than the separation of arrival times of the direct path and reflected signals.

Complex demodulation of the signal in each receiver channel is standard and simply requires product detection by multiplication of the signal with the in-phase and quadrature of the carrier wave referenced to the clock signal. After demodulation in each receiver channel, two outputs are produced representing the in-phase and quadrature components of the signal. The high frequency portion of each of these components is removed by low pass filtering, and the signals are then digitized by the analog-to-digital converter, in conventional manner.

For each receiver (hydrophone), the digitized in-phase and quadrature components are fed to microcomputer 64 for processing. The task of the microcomputer is to determine the time taken for the inhomogeneties in refractive index to pass between one path and the other.

Following transmission of each pulse by a transducer at the projector side of the channel, the signal travels through the water to a hydrophone at the receiver side of the channel via several possible paths (as indicated in FIG. 1). The direct route 39 is of primary interest and must be separated from surface and bottom reflections 40 and 43.

An example of the received signal strengths (derived from the modulus of the complex signal) is shown in FIG. 4. The direct path is identified by peak (i), the surface and bottom paths are identified by the peaks (ii) and (iii), and more complex paths are also indicated that decay afterward. The same process is repeated with the next transmission, for each (i)', (ii)', and (iii)' are identified in FIG. 4 as the corresponding peaks.

The microcomputer first identifies the peak corresponding to the direct pulse. This task is simplified by searching only within an appropriately located narrow window. Having identified the peak, the corresponding phase of the angle is determined (proper combining of the in-phase and quadrature signals in each channel yields phase information, while calculation of the modulus of both components yields amplitude information). This is done repeatedly for each hydrophone to generate phase time series as shown typically in FIG. 5 (wherein R1 refers to hydrophone 21 and R2 refers to hydrophone 22). Similar times series may likewise be generated for amplitude.

While many techniques can be used for determining the time taken for passage of inhomogeneties between the two paths, the now preferred technique is to identify two appropriate algorithms for application to the phase and amplitude information that is available from received acoustic signals (numerous algorithms have been described for application to electromagnetic radiation experiments in the atmosphere—see, for example, Wang, Ochs, and Lawrence, App. Optics, December 1981). Phase information is not normally available, however, in studies using electromagnetic radiation, because of the much higher frequencies involved.

In one technique that has been found successful in experimental verification of certain components of this invention, the cross-covariance of the two phase signals is calculated (shown as a solid curve in FIG. 6). The displacement of the peak is determined, and the physical separation of the acoustic paths divided by the time displacement thus calculated, gives the mean flow speed. Alternatively, the mutual coherence function can be calculated using the phase and amplitude derived from each acoustic path. The slope of the mutual coherence function thus derived, at zero time lag, is proportional to the mean flow speed perpendicular to the acoustic paths.

In a second approach, known as the Briggs approach, the auto-covariance function (shown as a dashed curve in FIGURE 6) is also calculated, and the intersection point of the two curves (auto- and cross-covariance) identified. The mean flow speed is then determined.

An output from microcomputer 64 is thus provided in the form of mean flow speed. If several transmitters and receivers are used with spatial aperture filtering, the output from the microcomputer can then be in the form of flow profile information. This output information can be transmitted as needed for real time display, and/or, if desired, can be coupled to a voice synthesizer or videotext device for real time navigation information via radio.

The system, as indicated in FIG. 2, shows the acoustic paths following straight lines. Over sufficiently long paths, refraction will cause the paths to become curved and under certain circumstances may preclude a direct and unreflected path between projectors and hydrophones. In this situation, it will, under some circumstances, still be possible to derive flow speed estimates from the reflected paths, but the depth of the measurement will be spread over the depths traversed by the reflected sound paths.

Moreover, even if direct paths are available, the reflected paths (as indicated in FIG. 2) may provide additional information on flow speed in different parts of the water column. For measurements of flows in channels where the desired result is an estimate of volume flow per unit time, it is necessary that the acoustic system be installed at more than one depth so that an integral volume flux may be inferred.

Alternately, a sound channel may exist, in which case the range of measurement over which wholly refracted (rather than reflected) paths are available will be greatly increased. The techniques described herein will be applicable in this case also.

Choice of acoustic frequencies and repetition rates are governed by the range over which arrangements are to be made in the closeness of multipath arrival time.

As an ancillary measurement, the transverse, or cross channel component, of the current (as opposed to cross-channel measurements) can also be recovered by using reciprocal transmission, in which acoustic signals are transmitted and received from both ends of the path. Processing of the resultant travel times in each direction yields both a mean sound speed value and also a mean current along the axis of the acoustic path. Since only a single reciprocal path is necessary for these measurements, the results are unambiguous. Moreover, the measurements exploit the phase of the received signal, rather than the amplitude alone, thus greatly enhancing the overall sensitivity and accuracy.

It is meant to be realized that changes and modifications can be made with respect to the exact embodiment of the invention, as disclosed, without departing from the intended scope of the invention. For example, the synchronizing, or timing, signal transmission link could be established utilizing cables, microwaves, and/or optics, the clock could be at the receiver side with the transmission link being then from the receiver side to the transmitter side, separate clocks could be utilized to eliminate the need for a timing signal transmission link (or to at least greatly simplify the link) where such clocks have the necessary sufficient accuracy and stability for measurement purposes as contemplated by this invention, the signal generator could be incorporated into the receiver side and transmitted therefrom to the projectors at the projector side, and/or components shown in specific signal paths could be combined through use of appropriate switching circuitry.

From the foregoing, it is to be appreciated that this invention provides a novel system and method for measuring liquid flow through a predetermined area utilizing acoustic beams positioned perpendicular to the direction of the component of liquid flow to be measured.

What is claimed is:

1. A system using acoustic signals for measuring the flow characteristics of water flowing through a predetermined area, said predetermined area having at least first and second opposed sides and a bottom with the distance between the sides being such that an acoustic signal transmitted through said water therebetween would include a direct acoustic signal path and at least one reflected acoustic signal path formed by said acoustic signal reflecting from at least one of the surface of said water and said bottom of said predetermined area, said system comprising:

a receiver array located at said first side of said predetermined area, said receiver array including at least two receivers spaced with respect to one another in a direction having at least one component parallel to the direction of flow of said water through said predetermined area;

a projector array located at said second side of said predetermined area, said projector array including at least two transducers spaced with respect to one another in a direction having at least one component parallel to the direction of flow of said water through said predetermined area, said projector array being mounted with respect to said receiver array so that at least a portion of the acoustic signals transmitted from said transducers pass through said water in a direction substantially perpendicular to the direction of flow of said water so as to be modified relative to flow direction before being received by said receivers;

timing signal generating means for generating signals providing both phase and amplitude references;

acoustic signal generating means connected with said timing signal generating means and said projector array to cause each of said transducers to transmit pulsed acoustic signals through said water; and signal processing means including signal selecting means, said signal processing means being connected with said timing signal generating means and said receiver array to receive signals from said receivers indicative of received acoustic signals travelling through said direct and reflected acoustic signal paths between said projectors and said receivers, said signal selecting means including separately selecting received acoustic signals from said direct and reflected paths and utilizing at least received acoustic signals travelling through said direct acoustic signal paths for derivation of phase and amplitude information therefrom relative to said phase and amplitude references of said timing signal generating means so that, responsive thereto, said signal processing means provides an output indicative of the speed of said water flowing through said predetermined area.

2. The system of claim 1 wherein said projector array and receiver array are positioned at opposite sides of an open channel, and wherein different ones of said transducers and receivers are substantially aligned with respect to one another so that separate paths are established through said water between said transducers and receivers.

3. The system of claim 1 wherein said timing signal generating means includes a clock directly connected with one of said signal generating means and said signal processing means, and connected to the other of said signal generating means and said signal processing means through a transmission link.

4. The system of claim 3 wherein said transmission link is a radio transmission link.

5. The system of claim 1 wherein said signal generating means includes a signal generator for generating a pulsed output signal and a pair of power amplifiers for separately receiving said pulsed output signal and coupling the same to said transducers at predetermined different times.

6. The system of claim 1 wherein said signal processing means includes first and second electrical channel means for separately processing the signals received from each said receiver, with each of the first and second electrical channel means including signal multiplying means for providing in-phase and quadrature output components of said signals indicative of phase and amplitude information.

7. The system of claim 6 wherein each of said electrical channel means also includes low pass filter means and analog-to-digital converter means.

8. The system of claim 1 wherein said signal processing means includes a microcomputer for providing said output indicative of the flow speed of said liquid.

9. The system of claim 1 wherein said signal selecting means enables utilization of received acoustic signals travelling through at least one of said reflected acoustic signal paths in addition to enabling utilization of received acoustic signals travelling through said direct acoustic signal paths for derivation of phase and amplitude information therefrom so that, responsive thereto, said signal processing means provides an output indicative of the speed of said water flowing through different parts of said predetermined area.

10. The system of claim 9 wherein said at least two receivers and said at least two transducers are each installed at more than one depth at their respective said sides of said predetermined area, and wherein said signal selecting means separately identifies and selects said signals indicative of said received acoustic signals travelling through said direct and said reflected acoustic signal paths between each of said projectors and said receivers for derivation of phase and amplitude information therefrom so that, responsive thereto, said processing means provides an output indicative of the volume flow per unit of time of said water through said predetermined area.

11. A method for using acoustic signals for measuring the flow characteristics of water flowing through a predetermined area, said predetermined area having at least first and second opposed sides and a bottom, with the distance between the sides being such that an acoustic signal transmitted through said water therebetween would include a direct acoustic signal path and at least one reflected acoustic signal path formed by said acoustic signal reflecting from at least one of the surface of said water and said bottom of said predetermined area, said method comprising:

generating timing signals providing both phase and amplitude references;

generating pulsed acoustic signals based upon said timing signals and transmitting said pulsed acoustic signals from at least two locations at said first side of said predetermined area through said liquid substantially perpendicular to the direction of flow of said liquid with said pulsed acoustic signals being modified relative to said flow direction during passage through said liquid, said locations being spaced with respect to one another in a direction having at least one component parallel to the direction of flow of said water through said predetermined area;

separately receiving said pulsed acoustic signals at said second side of said predetermined area after passage of said signals through said liquid and forming electrical output signals indicative of said received pulsed acoustic signals travelling through said direct and reflected acoustic signal paths;

separately processing said electrical output signals, including separating said electrical output signals indicative of said received acoustic signals travelling through said direct paths from said electrical output signals indicative of said received acoustic signals travelling through said reflected paths, for derivation of amplitude and phase indications therefrom relative to said phase and amplitude references provided by said timing signals; and utilizing said derived amplitude and phase indications to provide an output indicative of the speed of said water flowing through said predetermined area.

12. The method of claim 11 wherein said step of separately processing said electrical signals includes multiplying and filtering of said signals and wherein said indications are the in-phase and quadrature components of said signals.

13. The method of claim 12 wherein said step of separately processing said electrical signals includes digitally converting said signals after multiplying and filtering has occurred.

14. The method of claim 12 wherein said step of separately processing said electrical signals includes providing a microcomputer for receiving said indications and processing the same to thereby provide said indication of the speed of said liquid in said predetermined area.

* * * * *

UNITED STATES PATENT AND TRADEMARK OFFICE
CERTIFICATE OF CORRECTION

PATENT NO. : 4,760,743
DATED : August 2, 1988
INVENTOR(S) : Steven F. Clifford and David M. Farmer It is certified that error appears in the above-identified patent and that said Letters Patent are hereby corrected as shown below:

On the Title Page, at item [73] add to the assignee shown the following assignee: Canadian Patents and Development Limited, Ottawa, Canada.

Signed and Sealed this

Seventeenth Day of January, 1989

Attest:

DONALD J. QUIGG

*Attesting Officer*      *Commissioner of Patents and Trademarks*